United States Patent
Buhari

(10) Patent No.: US 11,114,941 B2
(45) Date of Patent: Sep. 7, 2021

(54) REDUCED VOLTAGE RATINGS FOR POWER TRANSISTORS IN A BUCK CONVERTER

(71) Applicant: TEXAS INSTRUMENTS INCORPORATED, Dallas, TX (US)

(72) Inventor: Riazdeen Buhari, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/732,201

(22) Filed: Dec. 31, 2019

(65) Prior Publication Data

US 2021/0203229 A1    Jul. 1, 2021

(51) Int. Cl.
| H02M 3/158 | (2006.01) |
|---|---|
| B60R 16/033 | (2006.01) |
| H02M 1/08 | (2006.01) |
| H02M 1/00 | (2006.01) |

(52) U.S. Cl.
CPC ........... *H02M 3/158* (2013.01); *B60R 16/033* (2013.01); *H02M 1/08* (2013.01); *H02M 1/0045* (2021.05)

(58) Field of Classification Search
None
See application file for complete search history.

(56) References Cited

U.S. PATENT DOCUMENTS

| 8,013,587 B2* | 9/2011 | Saeki | H02J 2207/20 323/303 |
|---|---|---|---|
| 8,988,054 B2* | 3/2015 | Marty | H02M 3/158 323/273 |
| 10,404,175 B2* | 9/2019 | Chakraborty | H02M 3/1588 |
| 2016/0020696 A1* | 1/2016 | Shibata | H02M 3/156 323/268 |
| 2019/0238060 A1* | 8/2019 | Telefus | H02M 7/2176 |
| 2019/0245435 A1* | 8/2019 | Botti | H02M 3/158 |

* cited by examiner

*Primary Examiner* — Thomas J. Hiltunen
(74) *Attorney, Agent, or Firm* — Mark Allen Valentti; Charles A. Brill; Frank D. Cimino

(57) ABSTRACT

A device includes a buck converter coupled to an input node and an output node, and a linear voltage regulator coupled to the input node and to the output node.

13 Claims, 4 Drawing Sheets

REDUCED VOLTAGE RATINGS FOR POWER TRANSISTORS IN A BUCK CONVERTER

BACKGROUND

A step-down direct current (DC)-to-DC voltage converter regulates an output voltage, where the output voltage is less in value than an input voltage provided by a power source. A buck converter topology denotes a class of DC-to-DC voltage converters with switching devices to control current through an inductor (and usually also a capacitor) to regulate the output voltage. A buck converter includes a high-side switching device to couple the inductor to the power source, and a low-side switching device to provide a current path from a ground node to the inductor when the high-side switching device is switched off. In some buck converters, the high-side switching device is a metal-oxide-semiconductor field-effect transistor (MOSFET), referred to as a high-side FET, and the low-side device is a MOSFET, referred to as a low-side FET.

SUMMARY

In accordance with at least one example of the disclosure, a device includes a buck converter coupled to an input node and an output node, and a linear voltage regulator coupled to the input node and to the output node.

In accordance with another example of the disclosure, device includes a buck converter configured to generate an output voltage based on an input voltage, and a port controller coupled to the buck converter and configured to couple to a pass transistor. The port controller is configured to receive a first signal indicating that the input voltage is above a first threshold voltage, generate a control signal for turning off the pass transistor in response to receiving the first signal, receive a second signal indicating that a gate voltage of the pass transistor is below a second threshold voltage, and turn off the buck converter in response to receiving the second signal. The device also includes a linear voltage regulator configured to regulate the output voltage while the buck converter is turned off.

In accordance with yet another example of the disclosure, a method for operating a buck converter includes receiving a first signal indicating that an input voltage to the buck converter is above a first threshold voltage; in response to receiving the first signal, generating a control signal for turning off a pass transistor coupled to an output of the buck converter; receiving a second signal indicating that a gate voltage of the pass transistor is below a second threshold voltage; in response to receiving the second signal, turning off the buck converter; and regulating a voltage of the output of the buck converter after turning off the buck converter.

In accordance with still another example of the disclosure, a device includes an automotive battery configured to provide an input voltage, a buck converter coupled to the automotive battery and configured to generate an output voltage based on the input voltage, a first comparator having an input coupled to the automotive battery and configured to assert a first output signal in response to the input voltage being above a first threshold voltage, and a port controller coupled to the buck converter and configured to couple to a pass transistor. The port controller includes a second comparator having an input coupled to a control terminal of the pass transistor and configured to assert a second output signal in response to a voltage of the control terminal being below a second threshold voltage, and a NAND gate having inputs configured to receive the first and second output signals. The buck converter is configured to turn off in response to an output of the NAND gate being de-asserted. The device also includes a linear voltage regulator configured to regulate the output voltage while the buck converter is turned off.

BRIEF DESCRIPTION OF THE DRAWINGS

For a detailed description of various examples, reference will now be made to the accompanying drawings in which.

DETAILED DESCRIPTION

Figure 1:
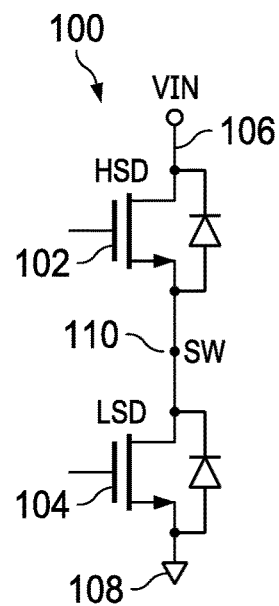
FIG. 1 is a schematic diagram of an illustrative power converter circuit in accordance with various examples.

A load dump fault can be experienced in certain applications in which a buck converter is utilized. A load dump fault refers to the disconnection of a powered load from a power source (e.g., a battery). One undesirable effect of a load dump fault is a voltage increase for other devices that remain connected to the load. For example, in the context of automotive electronics, a load dump fault occurs when the vehicle battery is disconnected from the alternator while the battery is being charged. As a result of the disconnection of the battery, other loads coupled to the alternator see a voltage increase or a surge in power.

A buck converter used in an application in which a load dump fault is a possible occurrence needs to tolerate the load dump fault or other condition causing an increase in voltage (e.g., protect devices receiving power from the buck converter). In particular, in response to a load dump fault, the buck converter turns off (e.g., both the high- and low-side FETs turn off) and a switched node between the high-side FET and the low-side FET discharges to a voltage at the ground node (e.g., due to junction or other sources of leakage). Thus, the high-side FET should withstand the spiking input voltage from the power source relative to the voltage at the ground node. Conventionally, a higher voltage-rated high-side FET is utilized to withstand the voltage increase that results from the load dump fault; however, higher voltage-rated FETs are associated with an increased Rsp*Qg factor, which is the product of the FET's on-state resistance and the gate charge of the FET. An increased Rsp*Qg factor, in turn, is associated with increased switching losses, which reduces the power that the buck converter is able to provide to one or more connected loads (e.g., devices).

Examples of the present disclosure are directed to a device in which the switched node of a buck converter is biased to a voltage greater than the voltage at the ground node, which reduces the voltage across the high-side FET during a load dump fault condition. By biasing the switched node to an appropriate voltage (e.g., relative to a maximum expected input voltage during a load dump fault), a lower voltage-rated high-side FET is utilized and still able to withstand the voltage increase that results from the load dump fault. For example, by biasing the switched node of the buck converter, a low-voltage process node device is utilized as the high-side FET rather than a mid-voltage process node device, which would be used if the switched node was not biased. The low-voltage process node device is associated with a reduced Rsp*Qg factor relative to the mid-voltage process node device, and thus is also associated with reduced switching losses during operation of the buck converter. The buck converter is thus able to provide a higher power level to one or more connected devices as a result of its reduced switching losses. These examples are explained more fully below, with reference made to the accompanying figures.

FIG. 1 shows a portion of an illustrative DC-to-DC voltage converter 100. In some examples, the portion of the DC-to-DC voltage converter 100 is a portion of a buck converter, shown without an output inductor and capacitor for simplicity. The portion of the buck converter 100 is hereinafter referred to as a buck converter 100 for convenience, and will be explained more fully with reference to FIG. 2, below. The buck converter 100 comprises a high-side FET 102 and a low-side FET 104. The high-side FET 102 is coupled to an input node 106 and a switched node 110, while the low-side FET 104 is coupled to the switched node 110 and to a ground node 108. Although not shown in FIG. 1, the buck converter 100 is controlled by a pulse-width modulation (PWM) modulator and a gate driver, which will be explained in further detail below.

For purposes of providing consistent numerical examples, the buck converter 100 is described in the context of an automotive application, in which the buck converter 100 converts a DC input voltage supplied by an automotive battery to a DC output voltage for Universal Serial Bus (USB) Type-C Power Delivery (PD) devices. However, it should be understood that the examples described herein are similarly applicable to other contexts, such as industrial or other applications, to reduce switching losses of the buck converter 100 by utilizing a lower voltage-rated high-side FET 102 than would otherwise be possible without biasing the switched node 110. In the automotive context, reducing the switching losses of the buck converter 100 allows the buck converter 100 to deliver more power to its load (e.g., a USB Type-C PD device).

Continuing the automotive example, a typical battery voltage or input voltage (VIN) under normal operating conditions is on the order of 13-15 V DC, while the output voltage at an output node coupled to the switched node 110 is on the order of 5 V DC. However, during an exemplary load dump fault condition, VIN rises to approximately 40 V. Although it is not necessary to continue operating the buck converter 100 during the load dump fault condition (e.g., to provide power to a connected USB Type-C PD device), as explained above the high-side FET 102 should be able to withstand the voltage increase that results from the load dump fault condition.

Conventionally, the buck converter 100 is turned off in response to the load dump fault condition, which discharges the switched node 110 to the ground node 108 (e.g., due to junction or other sources of leakage), which in turn results in the high-side FET 102 needing to withstand approximately 40 V. In an example, this requires the high-side FET 102 to be a higher voltage-rated FET (e.g., rated to 36 V, having an absolute maximum voltage of approximately 43 V), which pushes the high-side FET 102 into a mid-voltage process node having an increased Rsp*Qg factor. The increased switching losses that result from the increased Rsp*Qg factor prevent conventional buck converters from supporting higher power levels (e.g., 30 W), particularly for multi-port (e.g., multi-load) USB Type-C PD applications at higher frequencies.

Examples of this disclosure bias the switched node 110 to a voltage greater than the voltage at the ground node. The specific examples referred to herein include biasing the switched node 110 to 5 V, even when the buck converter 100 and/or associated pass transistors are not turned on. As a result, during a load dump fault condition, the voltage across the high-side FET 102 is reduced to an illustrative voltage of 35 V (e.g., VIN at 40 V minus the biased switched node 110 at 5 V). Thus, in one example, the high-side FET 102 is a lower voltage-rated FET (e.g., rated to 30 V, having an absolute maximum voltage of approximately 36 V), which results in a low-voltage process node high-side FET having a reduced Rsp*Qg factor. The reduced switching losses that result from the reduced Rsp*Qg factor allow the buck converter 100 described herein to support higher power levels (e.g., 30 W), particularly for multi-port (e.g., multi-load) USB Type-C PD applications at higher frequencies.

Figure 2:
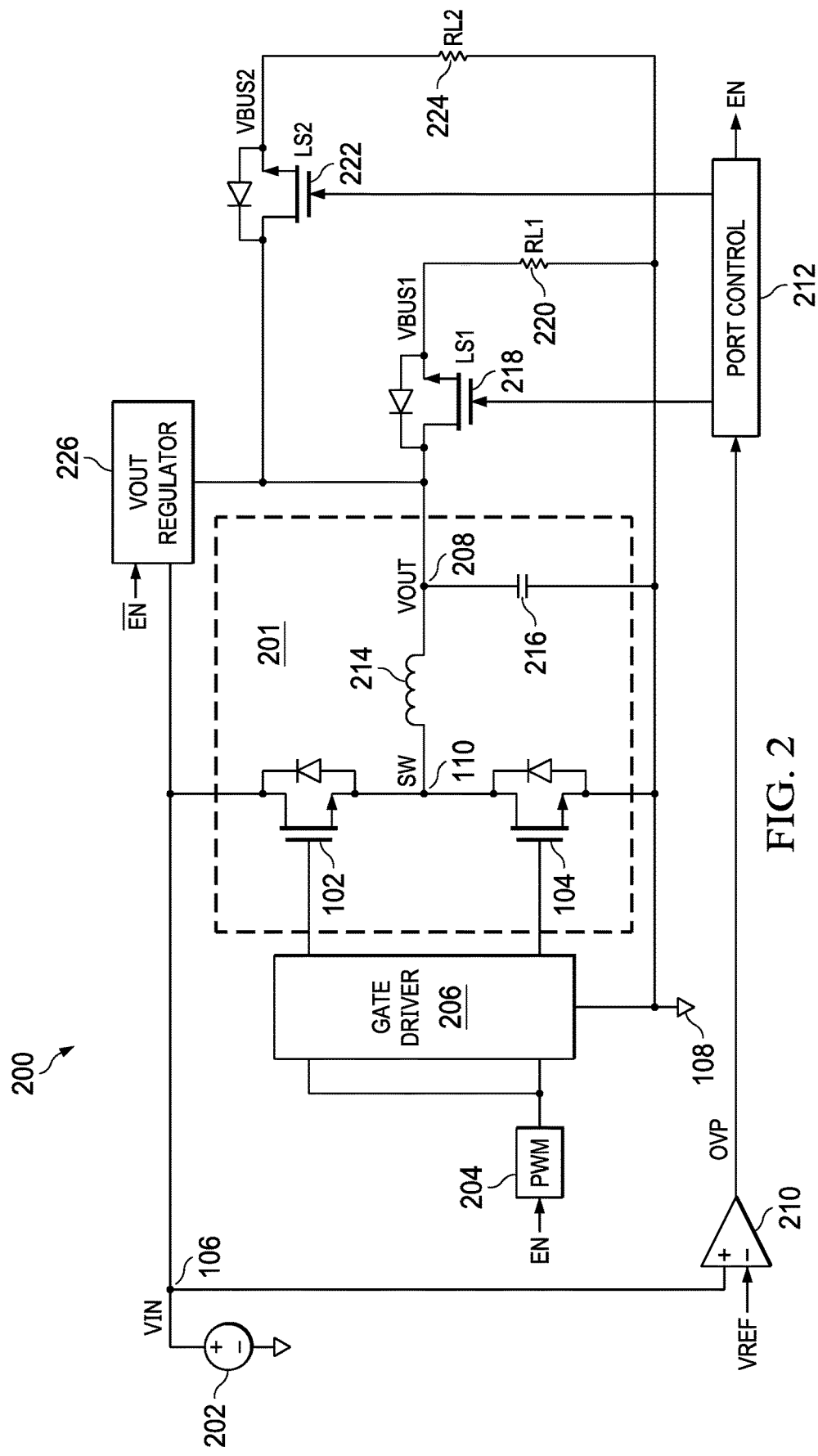
FIG. 2 is a schematic diagram of the illustrative power converter circuit of FIG. 1 in further detail and in accordance with various examples.

Turning to FIG. 2, a system 200 is shown that includes the high-side FET 102 and low-side FET 104 described above. As will be explained further below, FIG. 2 includes additional components relative to FIG. 1 to implement a buck converter 201. As in FIG. 1, the low-side FET 104 is coupled to the ground node 108 and to the switched node 110. Similarly, the high-side FET 102 is coupled to the switched node 110 and the input node 106. A voltage source 202 (e.g., an automotive battery) provides the input voltage VIN to the buck converter 201.

In certain buck converter 201 topologies, PWM is used to control the regulation of the output voltage (VOUT) relative to the input voltage (VIN). A PWM modulator 204 varies the duty cycle of the high-side FET 102 and low-side FET 104. An increased duty cycle results in a greater output voltage relative to the input voltage while a decreased duty cycle results in a lesser output voltage relative to the input voltage. Thus, the system 200 also includes a PWM modulator 204 coupled to a gate driver 206. The gate driver 206 includes a charge pump in some examples. The PWM modulator 204 is coupled to the high-side FET 102 and the low-side FET 104 by way of the gate driver 206. Some examples may include other modules (not shown) in addition to the PWM modulator 204 and the gate driver 206. For simplicity, it is assumed that the PWM modulator 204, through the gate driver 206, controls or causes the buck converter 201 to be on in response to receiving an asserted enable signal (EN), or to turn off in response to receiving a de-asserted enable signal.

The high-side FET 102 includes a gate, a source, and a drain. The source of the high-side FET 102 is coupled to the switched node 110 while the drain of the high-side FET 102 is coupled to the input node 106. The low-side FET 104 also includes a gate, a source, and a drain. The source of the low-side FET 104 is coupled to the ground node 108 while the drain of the low-side FET 104 is coupled to the switched node 110.

By way of the gate driver 206, the PWM modulator 204 is coupled to the gate of the high-side FET 102 to switch on and off the high-side FET 102 and is coupled to a gate of the low-side FET 104 to switch on and off the low-side FET 104 so as to provide an output voltage (VOUT, at an output node 208) to one or more loads represented by resistors 220, 224.

The loads 220, 224 are coupled to the output node 208 by pass transistors 218, 222, respectively. In this example, the pass transistors 218, 222 comprise n-type MOSFETs each having a drain coupled to the output node 208, a source coupled to their associated load 220, 224, respectively, and gates that are controlled by a port control circuit 212, which is explained further below. Although two loads 220, 224 and two pass transistors 218, 222 are shown, examples of this disclosure are also applicable to a buck converter 201 that supplies power to fewer (e.g., one) loads and to more loads (e.g., three or more, arranged in parallel as shown for the two-load example of FIG. 2). The output node 208 is coupled to the switched node 110 by an inductor 214. A capacitor 216 is also coupled to the output node 208 and to the ground node 108.

The PWM modulator 204 provides logic signals to the gate driver 206 to switch on and off the high-side FET 102 and the low-side FET 104. In some cases, the PWM modulator 204 also receives a feedback signal (e.g., based on VOUT, and not shown for simplicity) and controls the operation of the buck converter 201 based on the feedback signal. For example, the PWM modulator 204 increases or decreases the duty cycle based on the feedback signal. For example, if the feedback signal indicates that VOUT is lower than desired, then the feedback signal causes the PWM modulator 204 to increase the duty cycle, which is then carried out by the gate driver 206 to vary the on/off times of the high-side FET 102 and the low-side FET 104. If the feedback signal indicates that VOUT is higher than desired, then the feedback signal causes the PWM modulator 204 to decrease the duty cycle, which is then carried out by the gate driver 206 to vary the on/off times of the high-side FET 102 and the low-side FET 104.

As explained above, the switched node 110 is biased to a voltage greater than the voltage at the ground node 108 when the buck converter 201 is turned off. As a result, when the buck converter 201 is turned off (e.g., due to a load dump fault condition or other voltage increase above a threshold), the voltage across the high-side FET 102 is reduced, which allows the high-side FET 102 to be implemented using a lower voltage-rated device. Thus, the system 200 also includes a comparator 210 having a non-inverting terminal coupled to the input node 106 and an inverting terminal configured to receive a reference or threshold voltage (VREF). The comparator 210 thus compares VIN to VREF and asserts its output (OVP) in response to VIN exceeding VREF. Continuing the automotive application example, the VREF may be on the order of 20 V, which is greater than the expected normal operating voltage of the automotive battery (e.g., 13-15 V) but less than the expected voltage during a load dump fault condition (e.g., 40 V). Thus, the output of the comparator 210 is an indication of whether VIN has exceeded VREF. For example, the output of the comparator 210 is asserted when VIN is greater than VREF and is de-asserted when VIN is less than VREF.

The system 200 also includes a port control circuit 212, which is coupled to and configured to receive the output of the comparator 210. The port control circuit 212 is thus configured to receive a first indication from the comparator 210 that VIN has exceeded VREF (e.g., when the output of the comparator 210 is asserted). In response to receiving the first indication (e.g., an asserted signal) from the comparator 210, the port control circuit 212 is configured to turn off the pass transistors 218, 222, for example by coupling the gates of the pass transistors 218, 222 to the ground node 108. In some examples, the gate capacitance of the pass transistors 218, 222 is relatively large and thus the pass transistors 218, 222 require a non-negligible amount of time to fully turn off.

The port control circuit 212 is also configured to receive a second indication that the gate voltages of the pass transistors 218, 222 have dropped below a threshold voltage, indicating that the pass transistors 218, 222 are off. In response to receiving the second indication (e.g., based on a comparison of gate voltages of the pass transistors 218, 222 to a threshold, explained further below), the port control circuit 212 is configured to turn off the buck converter 201, for example by de-asserting the enable signal (EN) provided to the PWM modulator 204, which in turn causes the PWM modulator 204 to control the gate driver 206 to turn off the high-side FET 102 and the low-side FET 104. In another example, the port control circuit 212 is configured to turn off the buck converter 201 at approximately the same time or at the same time as the pass transistors 218, 222.

Once the port control circuit 212 has turned off the pass transistors 218, 222 and the buck converter 201, the loads 220, 224 are isolated from the output node 208, for example due to the direction of the body diodes of the pass transistors 218, 222. Additionally, the output capacitor 216 is relatively large and thus remains charged to approximately the output voltage of the buck converter 201 (e.g., 5 V in the automotive example). Further, the system 200 includes a voltage regulator 226 coupled to the input node 106 and to the output node 208. The voltage regulator 226 is configured to regulate VOUT at the output node 208 while the pass transistors 218, 222 and the buck converter 201 are turned off (e.g., in response to the enable signal (EN) being de-asserted). Continuing the automotive USB Type-C PD example, the voltage regulator 226 is configured to regulate VOUT to approximately 5 V. In the absence of the voltage regulator 226, even with the pass transistors 218, 222 turned off, the output capacitor 216 would eventually discharge through junction leakage or other sources of leakage, such as a printed circuit board to which the output node 208 is coupled, which would in turn pull the voltage at the switched node 110 to the voltage at the ground node 108.

As explained above, if the switched node 110 discharges all the way to the ground node 108, the high-side FET 102 should withstand 40 V during a load dump fault condition in the automotive context, which is undesirable for the reasons given above. Thus, by providing the voltage regulator 226, the voltage across the capacitor 216 is maintained (e.g., at 5 V) even when the buck converter 201 and the pass transistors 218, 222 are turned off. As a result, the switched node 110 also settles to 5 V, resulting in 35 V, rather than 40 V, across the high-side FET 102 during a load dump fault condition. As explained above, this allows the high-side FET 102 to be a lower voltage-rated FET (e.g., rated to 30 V, having an absolute maximum voltage of approximately 36 V), which results in the high-side FET 102 having a reduced Rsp*Qg factor. The reduced switching losses that result from the reduced Rsp*Qg factor allow the buck converter 201 to support higher power levels (e.g., 30 W), particularly for multi-port (e.g., multi-load 220, 224) USB Type-C PD applications at higher frequencies. The specific voltages described above are in the context of an automotive application, as explained, and are not intended to limit the scope of the examples described herein.

Figure 3:
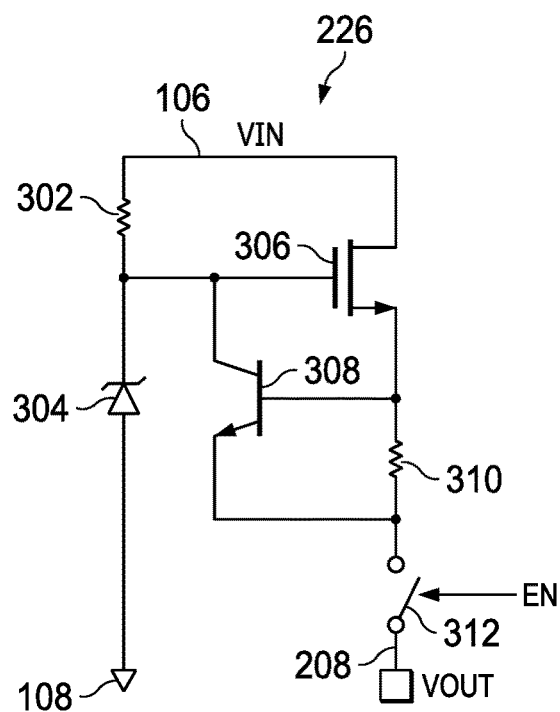
FIG. 3 is a schematic diagram of a VOUT regulator circuit of the illustrative power converter circuit of FIG. 2 in accordance with various examples.

FIG. 3 shows a schematic diagram of an exemplary circuit for the voltage regulator 226, explained above with respect to FIG. 2. In an example, the voltage regulator 226 is a linear voltage regulator. In particular, the voltage regulator 226 includes a first resistor 302 coupled to the input node 106 and to a Zener diode 304, which is in turn coupled to the ground node 108. The voltage regulator also includes a transistor 306, which in this case is an n-type MOSFET, a second resistor 310, and a second transistor 308, which in this case is a bipolar junction transistor (BJT). The n-type MOSFET 306 has a drain coupled to the input node 106, a source coupled to the second resistor 310, and a gate coupled to a node between the first resistor 302 and the diode 304. The BJT 308 has a collector coupled to the gate of the n-type MOSFET 306 and the node between the first resistor 302 and the Zener diode 304. In this example, the Zener diode 304 provides a reference voltage to the gate of the n-type MOSFET 306. The BJT 308 also has an emitter coupled to the output node 208 and a base coupled to the source of the n-type MOSFET 306.

When the output node 208 is supplied by the buck converter 201 (e.g., during normal operation of the buck converter 201), the voltage regulator 226 is turned off (e.g., controlled by the complement of the enable signal (EN), described above). However, when the buck converter 201 is turned off (e.g., due to a load dump fault condition), the voltage regulator 226 is turned on (e.g., in response to EN being de-asserted) and regulates VOUT to a particular voltage, which is 5 V in the automotive USB Type-C PD example described above. In on example, a switch 312 is coupled to the output node 208 and to the BJT 308 and resistor 310. The switch 312 is open in response to the EN signal being asserted, which decouples the voltage regulator 226 from the output node 208 when the buck converter 201 is on; the switch 312 is closed in response to the EN signal being de-asserted, which couples the voltage regulator 226 to the output node 208 when the buck converter 201 is off. The Zener diode 304 acts as a reference for the gate of the n-type MOSFET 306, which provides the output voltage VOUT based on its $V_{GS}$ and the Zener diode 304 voltage. The resistor 310 senses a current into the output node 208 because when the voltage drop across the resistor 310 reaches $V_{BE}$ of the BJT 308, the gate of the n-type MOSFET 306 is pulled down by the BJT 308, which limits the current into the output node 208. Thus, the BJT 308 regulates the voltage at the gate of the n-type MOSFET 306 to maintain a current into the output node 208, where the current value is set by the value of the resistor 310. It should be understood that the foregoing is one example implementation of the voltage regulator 226, and that other topologies to bias or clamp the output node 208 to a particular voltage are within the scope of this disclosure.

In another example, the voltage regulator 226 also functions to pre-charge the capacitor 216 as part of a start-up process of the buck converter 201, but before the buck converter 201 is turned on. For example, when a battery voltage is present at the input node 106, and the buck converter 201 is still off (e.g., the complement of the EN signal is asserted), the voltage regulator 226 turns on and regulates the output node 208 to a particular voltage (e.g., 5 V in the automotive example), charging the capacitor 216. When the output node 208 reaches the regulated voltage, the buck converter 201 is turned on to regulate the output node 208 once the capacitor 216 has been pre-charged. Once the buck converter 201 is turned on, the pass transistors 218, 222 are also turned on. In this example, the current limit provided by the resistor 310 limits in-rush current when initially charging the capacitor 216. However, during an exemplary load dump fault condition in which the voltage regulator 226 is turned on after the buck converter 201 is turned off, the current limit portion of the voltage regulator 226 is not active because the voltage across the resistor 310 does not reach $V_{BE}$ of the BJT 308 for relatively smaller leakage currents.

Figure 4:
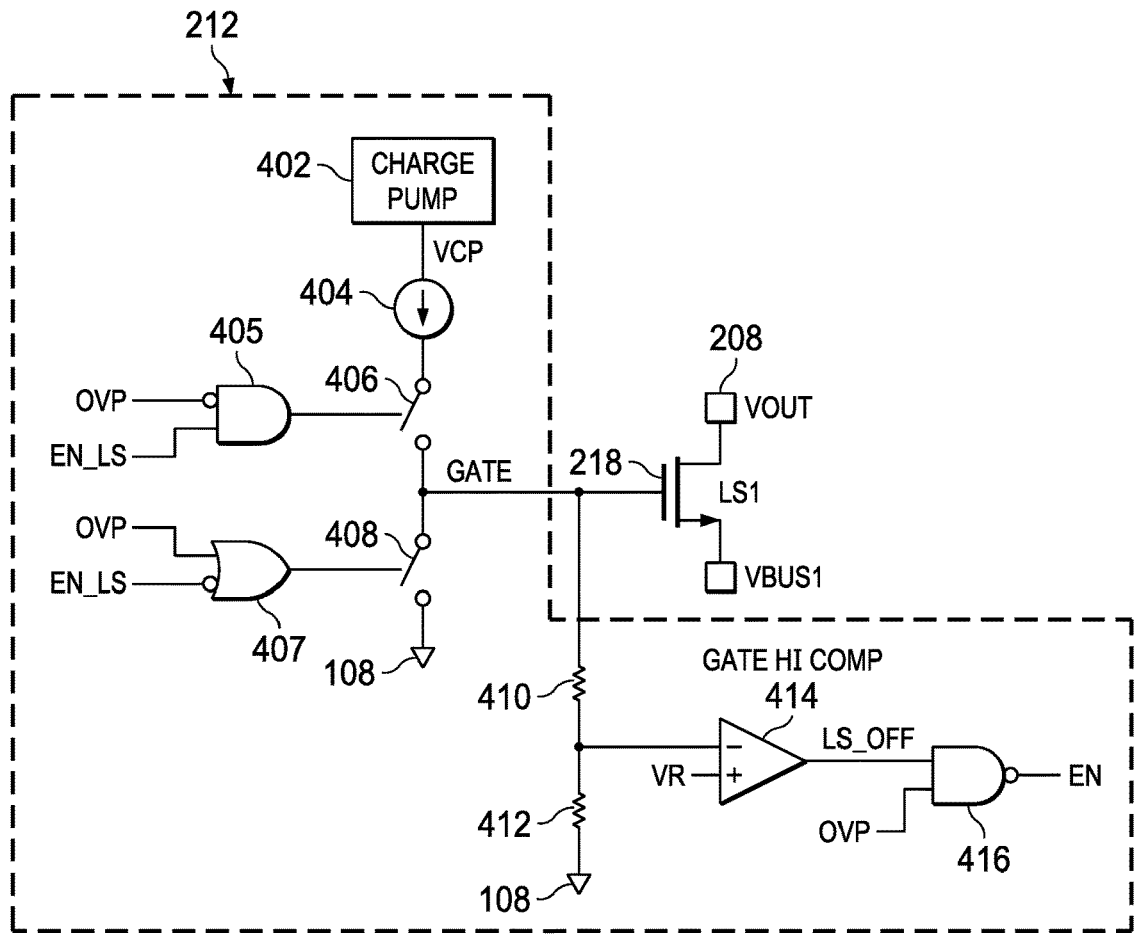
FIG. 4 is a schematic diagram of a port control circuit of the illustrative power converter circuit of FIG. 2 in accordance with various examples.

FIG. 4 shows a schematic diagram of the port control circuit 212, explained above with respect to FIG. 2. In particular, the port control circuit 212 includes a charge pump 402, which provides a charge pump voltage (VCP) to the gate of the pass transistor 218, sufficient to turn on the pass transistor 218. It should be appreciated that while the port control circuit 212 is described with respect to a single pass transistor 218 for simplicity, the port control circuit 212 is expandable to control and sense gate voltages of multiple pass transistors 218, 222 as well. A current source 404 is coupled to the output of the charge pump 402 and a first switch 406 is coupled to the current source and to the gate of the pass transistor 218. A second switch 408 is coupled to the gate of the pass transistor 218 and to the ground node 108.

In one example, the first and second switches 406, 408 are controlled by a combination of the output of the comparator 210 (OVP) and a load switch enable signal (EN_LS). In one example, an AND gate 405 receives an inverted OVP signal and the EN_LS signal as inputs, while the output of the AND gate 405 controls the first switch 406. Continuing this example, an OR gate 407 receives an inverted EN_LS signal and the OVP signal as inputs, while the output of the OR gate 407 controls the second switch 408. Thus, when EN_LS is asserted and OVP is de-asserted, indicating the pass transistor 218 is to be turned on and no over-voltage condition is occurring, the first switch 406 is closed, the second switch 408 is open, and thus VCP is provided to the gate of the pass transistor 218, which is on. Similarly, when either EN_LS is de-asserted or OVP is asserted, indicating the pass transistor 218 is to be turned off or an over-voltage condition is occurring, the first switch 406 is open, the second switch 408 is closed, and thus the gate of the pass transistor 218 is pulled to the ground node 108, which turns off the pass transistor 218. As explained above, OVP is asserted in response to VIN exceeding VREF, which indicates the occurrence of a load dump fault or other over-voltage condition, and in response the port control circuit 212 turns off the pass transistor 218. Thus, the pass transistor 218 is turned on and off at least based on whether a load dump fault condition is occurring. For simplicity in describing the examples of this disclosure, this example assumes that a load 220 remains coupled to the pass transistor 218. For example, if a load 220 were not coupled to the pass transistor 218 and OVP is de-asserted (e.g., a load dump fault condition is not occurring), the pass transistor 218 would not be turned on until a load 220 is coupled to the pass transistor 218. However, for simplicity, it is assumed that the load 220 remains coupled to the pass transistor 218, and thus switches 406, 408 are controlled by the output of the comparator 210 (OVP) and the EN_LS signal.

The port control circuit 212 also includes a voltage divider comprising resistors 410, 412 coupled to the gate of the pass transistor 218 and to the ground node 108. A comparator 414 has an inverting terminal coupled to the divided voltage node between the resistor 410 and the resistor 412 and a non-inverting terminal configured to receive a reference or threshold voltage (VR). The comparator 414 thus compares a divided voltage, which is related to the gate voltage of the pass transistor 218, to VR and asserts its output (LS_OFF) in response to the divided voltage falling below VR. In an example, VR is established at a level below which the divided voltage indicates that the pass transistor 218 is turned off.

The output of the comparator 414, LS_OFF, is provided as an input to a two-input NAND gate 416. The other input of the NAND gate 416 is coupled to the output of the comparator 210 (OVP). The output of the NAND gate 416 is de-asserted only when both LS_OFF and OVP are asserted, or when the pass transistor 218 is fully off and a load dump fault condition has been detected by the comparator 210. In all other cases, the output of the NAND gate 416 is asserted.

In this example, the output of the NAND gate 416 is the enable signal (EN) described above. Thus, when the output of the NAND gate 416 is asserted, the PWM modulator 204 controls the gate driver 206 to operate the buck converter 201 normally. Conversely, when the output of the NAND gate 416 is de-asserted, the PWM modulator 204 controls the gate driver 206 to turn off the high-side FET 102 and the low-side FET 104, and thus the buck converter 201.

Figure 5:
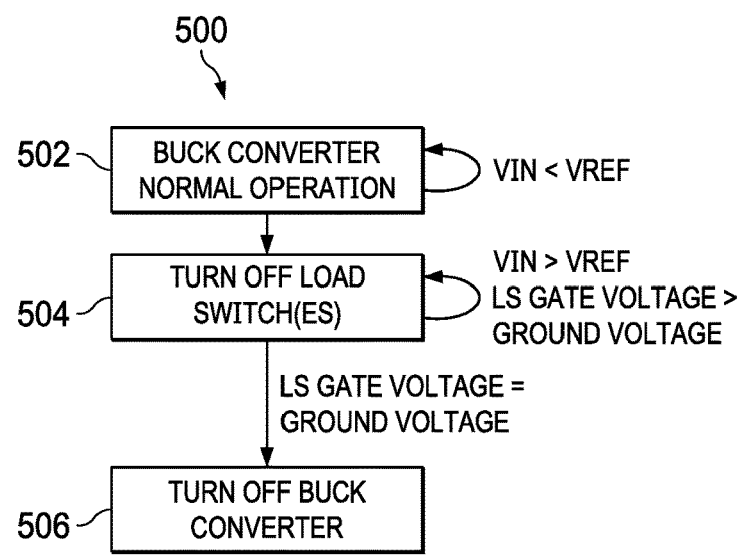
FIG. 5 shows a state diagram that depicts exemplary functionality of the illustrative power converter circuit of FIG. 2 in accordance with various examples.
Figure 6:
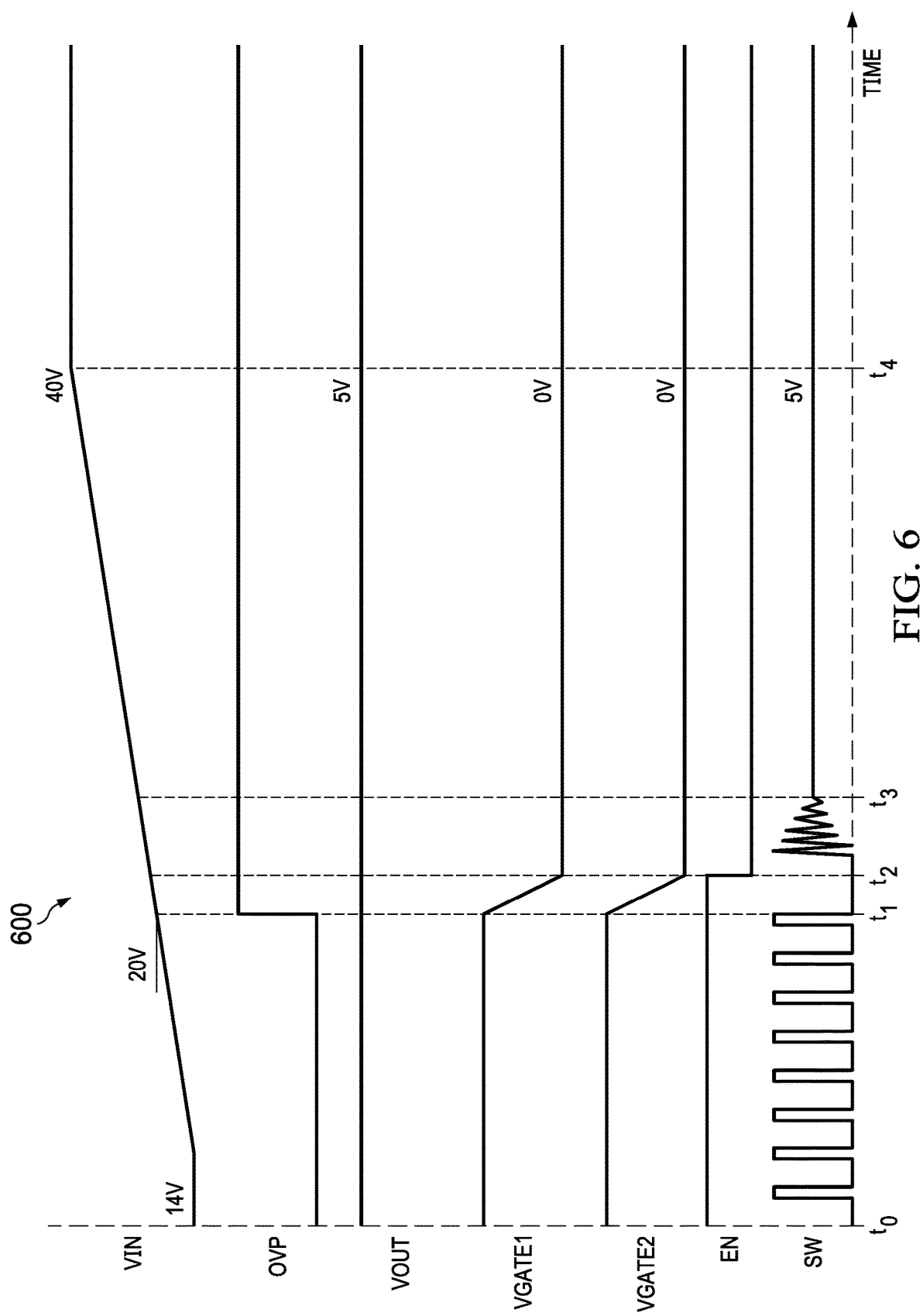
FIG. 6 shows a set of waveforms that depict exemplary functionality of the illustrative power converter circuit of FIG. 2 in accordance with various examples.

FIG. 5 shows a state diagram of a method 500 in accordance with examples of this disclosure, while FIG. 6 shows a set of waveforms 600 that demonstrate the functionality of the system 200 described above, with respect to FIG. 2. Reference is made to FIGS. 5 and 6 together. FIG. 6 shows voltage levels for various nodes of the system 200, described above, as a function of time. For example, the VIN waveform corresponds to the voltage at the input node 106 (VIN), described above. The OVP waveform corresponds to the output of the comparator 210 (OVP), which is either asserted or de-asserted. The VOUT waveform corresponds to the voltage at the output node 208 (VOUT), described above. The VGATE1 and VGATE2 waveforms correspond to the gate voltages of the load resistors 220, 224, respectively. The EN waveform corresponds to the enable signal generated by the NAND gate 416 of the port controller 212, described above. Finally, the SW waveform corresponds to the voltage at the switched node 110, described above.

The method 500 begins in block 502 in which the buck converter 201 is in a normal operating mode, which corresponds to time t0 in FIG. 6. Continuing the automotive USB Type-C PD example from above, VIN is at 14 V (e.g., the automotive battery supplies its normal voltage) and thus OVP is de-asserted indicating no load dump fault condition is occurring. As a result, the port controller 212 outputs an asserted EN signal, which causes the buck converter 201 to maintain VOUT at 5 V, while a voltage is provided to VGATE1 and VGATE2 sufficient to turn on the pass transistors 218, 222. Further, the switched node 110 (SW) oscillates between the voltage at the ground node 108 and the voltage at the input node 106 as the PWM modulator 204 and gate driver 206 control the high-side FET 102 and the low-side FET 104 of the buck converter. As long as VIN remains below VREF, which in one example is approximately 20 V, the method 500 remains in block 502.

However, when VIN exceeds VREF, this indicates that a load dump fault or other over-voltage condition is occurring, and the method 500 continues to block 504, in which the port control circuit 212 turns off the pass transistors 218, 222, in response to OVP being asserted because VIN has exceeded VREF. The transition to block 504 corresponds to time t1 in FIG. 6. As explained above, in some examples, the gate capacitance of the pass transistors 218, 222 is relatively large and thus the pass transistors 218, 222 require a non-negligible amount of time to fully turn off, which is reflected in the gradual decline in VGATE1 and VGATE2 from time t1 to time t2 in FIG. 6. Thus, as long as the gate voltage of the pass transistors 218, 222 remains above a threshold (e.g., a ground voltage), the method 500 remains in block 504.

Once the gate voltage of the pass transistors 218, 222 drops below the threshold (e.g., the divided voltage falls below VR as described in FIG. 4, above), the method 500 continues to block 506, in which the buck converter 201 is turned off in response to the port controller 212 de-asserting the enable signal (EN), which corresponds to time t2 in FIG. 6. Once the buck converter 201 is turned off, the voltage at the switched node 110 (SW waveform) rings for a period of time as the current through the inductor 214 ripples around zero. However, the duration of the SW rippling from time t2 to t3 is relatively short compared to the rise time of VIN, which does not reach 40 V until t4, well after the SW rippling has ceased. As a result, although SW does not immediately settle to 5 V (e.g., it ripples to voltages greater than 5 V), in an example VIN does not increase quickly enough to pose a risk of exceeding the rated voltage of the high-side FET 102. In this example, SW settles to 5 V prior to VIN reaching 40 V, ensuring that the high-side FET 102 need only sustain 35 V as explained above.

As explained above, as a result of biasing the switched node 110 to a voltage greater than the voltage at the ground node 108, a lower voltage-rated high-side FET 102 is able to be used, which results in the high-side FET 102 having a reduced Rsp*Qg factor. The reduced switching losses that result from the reduced Rsp*Qg factor allow the buck converter 201 described herein to support higher power levels, and at higher frequencies.

Further, while the examples above were described with respect to an automotive application for numerical consistency, examples described herein are similarly applicable to other contexts, such as industrial or other applications, to reduce switching losses of the buck converter 201 by utilizing a lower voltage-rated high-side FET 102 than would otherwise be possible without biasing the switched node 110.

In the foregoing discussion, the terms "including" and "comprising" are used in an open-ended fashion, and thus should be interpreted to mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., FET, metal oxide semiconductor FET (MOSFET), n-type, p-type, etc.), these components may be exchanged for components of other process technologies (e.g., replace FET and/or MOSFET with BJT, replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A device, comprising:
 a buck converter configured to generate an output voltage based on an input voltage;
 a port controller coupled to the buck converter and configured to couple to a pass transistor,
  the port controller configured to:
   receive a first signal indicating that the input voltage is above a first threshold voltage;
   generate a control signal for turning off the pass transistor in response to receiving the first signal;
   receive a second signal indicating that a gate voltage of the pass transistor is below a second threshold voltage; and
   turn off the buck converter in response to receiving the second signal; and
 a linear voltage regulator configured to regulate the output voltage while the buck converter is turned off.

2. The device of claim 1, further comprising a comparator configured to generate the first signal that the input voltage is above a first threshold voltage.

3. The device of claim 1, further comprising:
 a first pass transistor coupled to the buck converter and the port controller; and
 a second pass transistor coupled to the buck converter and to the port controller,
 wherein the first and second pass transistors are configured to selectively couple first and second loads, respectively, to the buck converter.

4. The device of claim 3, wherein the port controller is further configured to:
 receive a third signal indicating that a gate voltage of each of the first and second pass transistors is below the second threshold voltage; and
 turn off the buck converter in response to receiving the third signal.

5. The device of claim 1, wherein the port controller is further configured to:
 receive a third signal indicating that the input voltage is below the first threshold voltage; and
 turn on the pass transistor and the buck converter in response to receiving the third signal.

6. A method for operating a buck converter, comprising:
 receiving a first signal indicating that an input voltage to the buck converter is above a first threshold voltage;
 in response to receiving the first signal, generating a control signal for turning off a pass transistor coupled to an output of the buck converter;
 receiving a second signal indicating that a gate voltage of the pass transistor is below a second threshold voltage;
 in response to receiving the second signal, turning off the buck converter; and
 regulating a voltage of the output of the buck converter after turning off the buck converter.

7. The method of claim 6, further comprising generating, by a comparator, the first signal that the input voltage is above a first threshold voltage.

8. The method of claim 6, further comprising:
 selectively coupling a first load to the buck converter by a first pass transistor; and
 selectively coupling a second load to the buck converter by a second pass transistor.

9. The method of claim 8, further comprising:
 receiving a third signal indicating that a gate voltage of each of the first and second pass transistors is below the second threshold voltage; and
 in response to receiving the third signal, turning off the buck converter.

10. The method of claim 6, further comprising:
 receiving a third signal indicating that the input voltage is below the first threshold voltage; and
 in response to receiving the third signal, turning on the pass transistor and the buck converter.

11. A device, comprising:
 a buck converter adapted to be coupled to an automotive battery to receive an input voltage, the buck converter configured to generate an output voltage based on the input voltage;
 a first comparator having an input coupled to the automotive battery and configured to assert a first output signal in response to the input voltage being above a first threshold voltage;
 a port controller coupled to the buck converter and configured to couple to a pass transistor, the port controller comprising:
  a second comparator having an input coupled to a control terminal of the pass transistor and configured to assert a second output signal in response to a voltage of the control terminal being below a second threshold voltage; and
  a NAND gate having inputs configured to receive the first and second output signals, wherein the buck converter is configured to turn off in response to an output of the NAND gate being de-asserted; and
 a linear voltage regulator configured to regulate the output voltage while the buck converter is turned off.

12. The device of claim 11, wherein the port controller is configured to:
 receive the first output signal indicating that the input voltage is above a first threshold voltage;

generate a control signal for turning off the pass transistor in response to receiving the first output signal;
receive the second output signal indicating that a gate voltage of the pass transistor is below a second threshold voltage; and
turn off the buck converter in response to receiving the second output signal.

13. The device of claim 11, wherein a voltage rating of a high-side transistor of the buck converter is less than an automotive load dump voltage in response to the automotive battery being disconnected.

* * * * *